United States Patent
Pedrollo

(10) Patent No.: US 8,827,666 B2
(45) Date of Patent: Sep. 9, 2014

(54) SUBMERGED PUMP WITH PROTECTED ELECTRICAL CABLES

(75) Inventor: Silvano Pedrollo, Verona (IT)

(73) Assignee: Pedrollo S.p.A., San Bonifacio (VR) (IT)

( * ) Notice: Subject to any disclaimer, the term of this patent is extended or adjusted under 35 U.S.C. 154(b) by 471 days.

(21) Appl. No.: 13/272,026

(22) Filed: Oct. 12, 2011

(65) Prior Publication Data

US 2012/0070319 A1 Mar. 22, 2012

(51) Int. Cl.
| | |
|---|---|
| F04B 17/03 | (2006.01) |
| H02K 5/22 | (2006.01) |
| F04D 29/42 | (2006.01) |
| F04D 13/08 | (2006.01) |
| F04D 29/62 | (2006.01) |
| H02K 5/132 | (2006.01) |

(52) U.S. Cl.
CPC .............. F04D 13/08 (2013.01); H02K 5/225 (2013.01); F04D 29/426 (2013.01); F04D 29/628 (2013.01); H02K 5/132 (2013.01)
USPC ................ 417/423.3; 417/423.14; 417/424.2

(58) Field of Classification Search
CPC . F04D 29/426; F04D 29/4266; F04D 13/086; F04D 13/08; H04K 5/132
USPC ............................... 417/423.3, 423.14, 424.2
See application file for complete search history.

(56) References Cited

U.S. PATENT DOCUMENTS

| | | | |
|---|---|---|---|
| 4,019,836 A | 4/1977 | Deters | |
| 4,293,288 A * | 10/1981 | Weber | 417/434 |
| 5,262,065 A * | 11/1993 | Hansen | 210/747.7 |
| 6,666,664 B2 * | 12/2003 | Gross | 417/423.3 |
| 7,264,449 B1 * | 9/2007 | Harned et al. | 417/36 |
| 7,396,216 B2 * | 7/2008 | Blauch et al. | 417/423.3 |
| 7,443,067 B2 * | 10/2008 | Schlosser | 310/71 |
| 7,611,339 B2 * | 11/2009 | Tetzlaff et al. | 417/422 |
| 7,666,013 B1 * | 2/2010 | Kopecky et al. | 439/191 |
| 2005/0123425 A1 * | 6/2005 | Smith et al. | 417/424.1 |
| 2006/0250754 A1 | 11/2006 | Schlosser | |
| 2010/0008796 A1 * | 1/2010 | Vedsted | 417/244 |

* cited by examiner

*Primary Examiner* — Charles Freay
(74) *Attorney, Agent, or Firm* — John Alumit

(57) ABSTRACT

The present invention concerns a submerged pump with electrical cables external of the cylindrical lateral wall wherein the protection means, conformed for the lodging of said cables, are predisposed to be restrained to the pump body by means of quick fixing devices associable to bayonet sliding triggers for quick and stable locking and releasing, between said means of protection and the lateral wall of the pump, with possibly interposed fixed lantern elements and a resilient protection band as a suction filter.

7 Claims, 2 Drawing Sheets

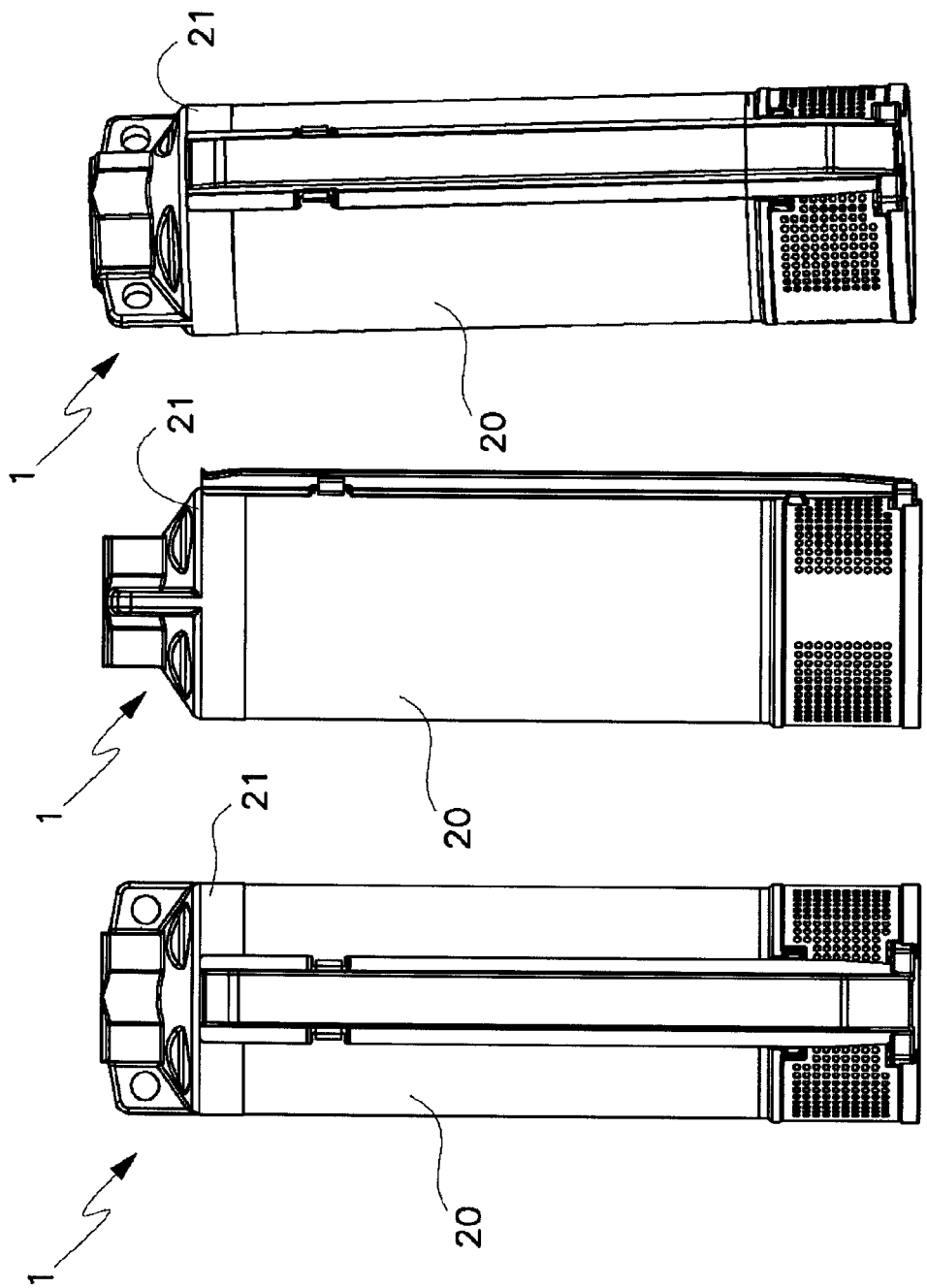

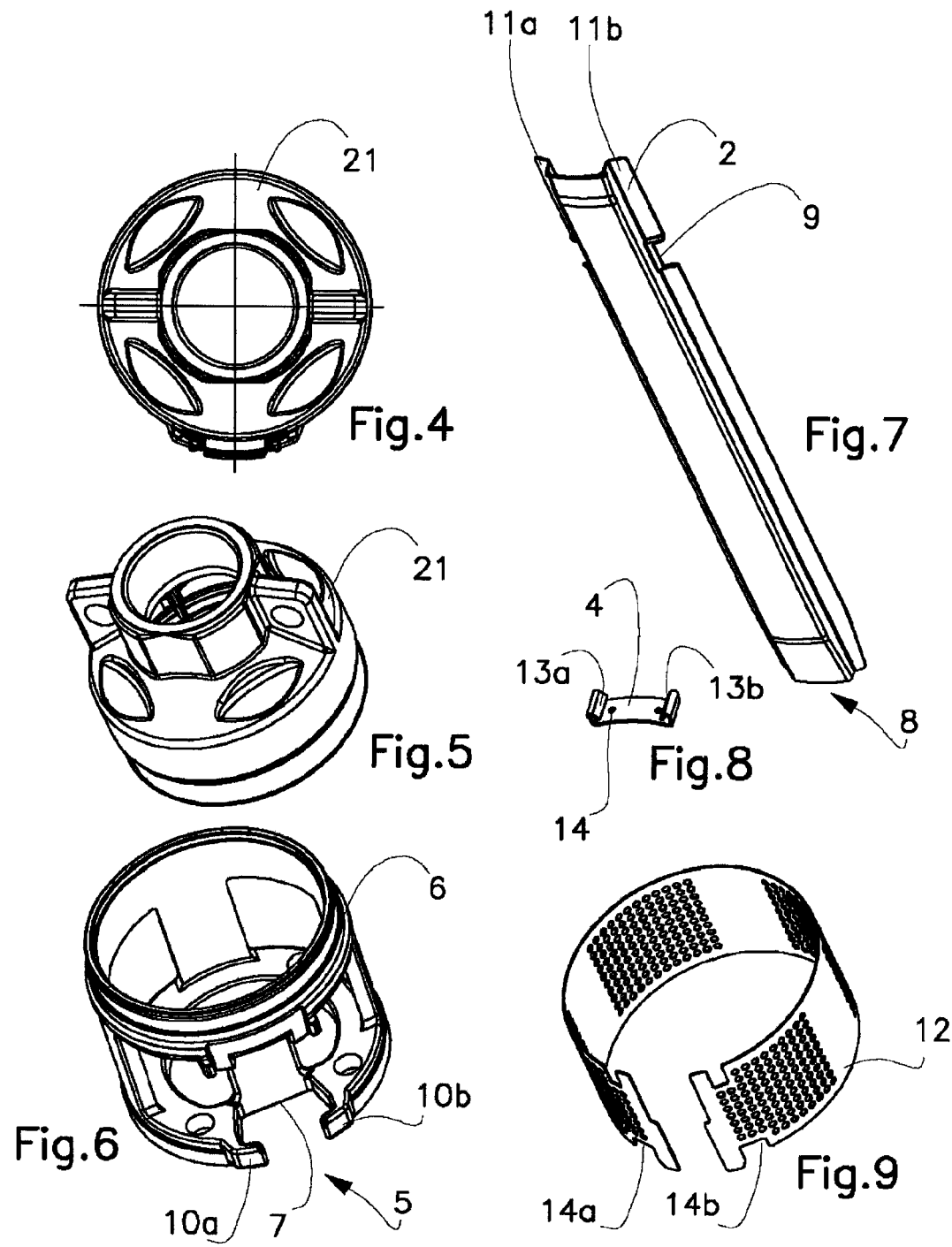

SUBMERGED PUMP WITH PROTECTED ELECTRICAL CABLES

CROSS-REFERENCE TO RELATED APPLICATION

This application claims the benefit of the priority filing date of international application no. PCT/EP2009/059855, and Italian application no. MI2009A000615 filed on Apr. 16, 2009.

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The present invention relates to a submerged pump with electrical cables outside a cylindrical lateral wall, in which protection means conformed to receive the cables are arranged as to be restrained to the body of the pump by means of quick fixing devices, which may be associated with bayonet sliding triggers to activate closing and opening connections easily executable by means of pushes, click-lifting by simple radial pressure, or simple shift restraining between the parts.

Pumping members, such as submerged pumps, are known, and are generally used for domestic, civil and industrial purposes for emptying sump pits, underground rooms, tanks or similar vessels. Known submerged pumps generally include a delivery body, within which an impeller communicates with the external environment, and a generally cylindrical driving body adapted to receive a driving member.

An example of a known submerged pump is disclosed in U.S. Pat. No. 5,207,562. The described submerged pump is provided with a particular handle adapted to incorporate a passage channel for the electrical supply cables of the driving member therein, as well as a port for introducing lubrication and cooling oil into the driving body.

U.S. Pat. No. 2,701,529 discloses in turn a submerged pump comprising a casing provided with a cylindrical lateral wall, a bottom wall and an upper lid for closing the open top of the pump. Such a lid has a single opening for passing both the supply cable of the actuating motor of the pump impeller and a pair of electrical cables connected to the motor itself and intended to be externally connected to liquid level control means. For connecting and fixing these control means, the lid laterally has a pair of lateral supports, in which the respective electrical cables are adapted to be inserted and appropriately connected. Thus, the need to ensure reliable electrical connection under all conditions of use is known in submerged pumps.

In order to satisfy this need, appropriate electrical cable protection means are used, which form a channel outside the body of the pump, for receiving and passing the cables. These protection means have become more widespread, and usually consist of a profiled element coupled to the body of the pump by means of an appropriate connection means, e.g. screw. However, these protection devices do not fully meet the requirements of the concerned field. These systems, while effectively protecting the electrical cables, are indeed not very practical in application. Assembling the cable protection means is slow and difficult, generally requiring coupling by means of screws. In particular, it has been observed that rapid assembly is an essential feature for handheld submerged pumps, which require easy transportation and installation for effective use under emergency conditions.

It is the task of the present invention to solve the mentioned problems by providing a submerged pump with a simple electrical cable protection device which can quickly be assembled. In the scope of this task, it is a further object of the present invention to provide a safe and reliable electrical cable protection device for all conditions of use.

Another object of the present invention is to provide an electrical cable protection device that is both effective and simple to use.

Another object of the present invention is to provide an electrical cable protection device of simple construction, versatile, and relatively low in cost.

The basic embodiment of the invention thus comprises an electrical cable protection means restrained externally to the body of the pump which totally eliminates drawbacks and disadvantages related to the known art.

Furthermore, the achievement of said objects, and others, is ensured in accordance with the above, in that the present invention relates to a submerged pump having electrical cable protection means restrained outside the body of the pump by means of quick fixing devices, which activate closing and opening connections easily, and are executable by means of pushes or click-lifting by simple radial pressure. Said devices are associable with bayonet sliding triggers for quick and stable blocking and releasing between said protection means and the lateral wall of the pump.

SUMMARY

The present invention relates to a submerged pump having electrical cable protection means restrained outside the body of the pump by means of quick fixing devices, which activate closing and opening connections and are easily executable by means of pushes or click lifting by simple radial pressure. Said devices are associable with bayonet sliding triggers for quick and stable blocking and releasing between said protection means and the lateral wall of the pump.

According to one embodiment, the quick fixing devices are receptacles conformed with resilient tails which engage notches positioned along the protection means and said receptacles are preferably soldered to the cylindrical lateral wall of the submerged pump body.

According to a further embodiment, the quick fixing devices are substantially conformed as an arc of a circle for a surface contact to the lateral cylindrical wall and are provided with inwardly shaped resilient tails, suitable to elastically deform upon simple joining pressure to receive and hold the protection means by at least one notch positioned along the longitudinal development of the protection means.

According to a further embodiment, the bayonet sliding triggers comprise a lantern-sleeve applied inferiorly to the body of the pump and which has a shaped seat predisposed to receive by plugging the terminal inferior portion of the protection means. Said shaped seat has a cavity positioned radially in the lantern-sleeve, partially externally contained by two appendices.

According to a further embodiment, the protection means consist of a longitudinal raceway element having a "U" profile-like section, provided with edges which extend towards the outside for a surface support contact with the cylindrical external wall of the body of the pump. Said protection means also have a longitudinally flaring profile at an inferior terminal protection, suitable to ease the coupling of the protection means to the shaped seat for a quick bayonet fixing.

According to a further embodiment, the quick fixing means are small disks or blocks, similar to a snap fastener, positioned along the edges of the protection means and on the cylindrical wall of the pump to click join or divide the cylindrical body of the pump and the protection of the electrical cables (juxtaposed in the scope of their functionality) by simple pressure.

DRAWINGS

The invention is described in detail below on the basis of the embodiment diagrammatically illustrated in the accompanying drawings, which outline the features of the invention; it should be noted that all the accompanying drawings, as well as the description of the drawings themselves, correspond to a preferred embodiment to better understand the implementation thereof; however, possible variations of reciprocal positions of the members, as well as the consequent simplifications, which could derive therefrom, and all the constructional variants included in the general idea are comprised within the requested scope of protection, which is presented in the accompanying drawings.

FIG. 1 is a frontal view of a submerged pump according to the present invention;

FIG. 2 is a side view of the same submerged pump;

FIG. 3 is an axonometric view of the submerged pump;

FIG. 4 is a plan view of the submerged pump;

FIG. 5 is an axonometric view of the upper closing assembly of the submerged pump of the present invention;

FIG. 6 is an axonometric view of the bayonet fixing means of the electrical cable protection means of the pump;

FIG. 7 is an axonometric view of said electrical cable protection means of the pump;

FIG. 8 is an axonometric view of the quick fixing means of said electrical cable protection means;

FIG. 9 is an axonometric view of a resilient protection band of the pump which serves as a filter for the suction openings.

In the figures, corresponding parts or parts with like functions are provided with the same reference characters for simplicity purposes. Similarly, in the figures, for clarity purposes of the whole, the operation of the operative members of the pump, consisting of a pumping assembly and a motor assembly of the electric type with the motor axis and the mechanism and circuit element sets, is not illustrated because they are already known, and also because they are not required for a proper understanding of the present invention.

DESCRIPTION

With particular reference to these figures, numeral 1 indicates as a whole a pump 10 of the submerged type according to the invention. The pump 1 comprises an essentially cylindrical central body, which receives impellers, of the known type, intended to transfer a liquid in which the pump 1 is at least partially submerged. The central body is laterally closed by a cylindrical wall 20, and is closed at its top by a closing assembly 21, usually provided with handles or other known gripping means. The closing assembly 21 includes one or more outlet holes for delivery pipes of the processed liquid. The central body is inferiorly closed by a base, which has appropriate openings for introducing fluid to be processed and for a mechanical connection to a driving member of known type (not shown).

The lower base of the central body is inferiorly and coaxially connected to an essentially cylindrical lantern-sleeve 6. The lantern-sleeve 6 is, in turn, inferiorly connected to the driving member for operating the pump.

The lantern-sleeve 6 has a plurality of openings positioned in the lateral surface, adapted to allow the introduction of liquid to be processed. The lantern-sleeve 6 further has a cavity 7 radially positioned in the lateral surface, partially externally enclosed by a pair of teeth 10a, 10b. The cavity 7 is inferiorly open to allow the electrical supply cables of the driving member underneath to pass outwards.

The lantern-sleeve 6 is partially lined with a resilient protection band 12, appropriately provided with a plurality of through holes, adapted to allow the passage of the liquid to be processed, thus preventing the introduction of possible foreign bodies. The band 12 is wound about the lantern-sleeve 6 and is press fitted at the cavity 7, thus remaining locked in place by virtue of the teeth 10a, 10b which are inserted into respective notches 14a, 14b positioned on the lower edge of the band 12.

The pump 1 comprises protection means 2 of the electrical supply cables of the driving member, externally restrained to the body of pump 1, so as to form a raceway for receiving the cables themselves. The protection means 2 preferably consist of a profiled element having an essentially U-shaped section, longitudinally provided with a pair of edges 11a, 11b which protrude outwards, adapted to be put in contact with the lateral wall 20 of the pump 1.

The profiled element 2 is inferiorly restrained to the pump 1 by means of first bayonet fixing means 5, essentially consisting of the cavity 7 of the lantern-sleeve 6 and the respective teeth 10a, 10b. In particular, the lower terminal portion 8 of the profiled element 2 is adapted to be inserted with a bayonet fitting into the cavity 7, and locked in position by the contrast action exerted by the walls of the cavity 7 and by the teeth 10a, 10b. For this purpose, in order to facilitate the fitting of the profile 2, the terminal portion 8 advantageously has a longitudinally flared profile.

The profiled element 2 is further superiorly restrained to the lateral wall 20 of the pump 1 by means of quick fitting means 4, restrained to the body of pump 1 and adapted to be elastically deformed to receive and hold the upper portion of the profiled element 2. In particular, the second quick fitting means 4 preferably consist of U-shaped receptacles with resilient tails 13a and 13b which engage in notches 9 positioned along the protection means 2. Said essentially U-shaped section receptacles 4 are either riveted or preferably spot soldered 14 or joined with adhesives to the cylindrical lateral wall 20 of the body of the pump 1. Said resilient tails 13a and 13b are inwardly shaped, adapted to elastically deform to receive and hold the profiled element 2 at the notch 9 positioned along the upper longitudinal edge of the profiled element 2.

The use of the submerged pump according to the invention, and in particular of the electric cable protection system, may easily be inferred from the above description.

In order to rapidly assemble the cable protection system once the pump has been installed, it is sufficient to bayonet fit the terminal part 8 of the profiled element 2 into the cavity 7, and then lock the upper part of the element 2 against the lateral wall of the pump (1) by exerting a pressure in the radial direction at the grooved seat 9.

The submerged pump according to the invention thus achieves the object of providing a quick fitting, electric cable protection device. In particular, such a result is obtained by virtue of the presence of the quick fitting means 4, adapted to elastically deform to receive and hold the electrical cable protection means 2.

An advantage of the invention is that the described cable protection device reduces the time to assemble and set-up the pump, a feature which is particularly useful and appreciated in the case of movable submerged pumps, which require easy and rapid transportation and installation to allow an effective use thereof under emergency conditions.

Another advantage of the cable protection device according to the invention resides is the low construction cost. In the practical embodiment of the invention, the materials employed, as well as the shape and size thereof, may be varied according to needs. Where the technical features mentioned in each claim are followed by reference signs, these reference signs are included for the sole purpose of improving the understanding of the claims and, therefore, they have no restrictive value on the aim of each element identified by way of example by these reference signs. The invention here suggested by an original solution, is not obviously restricted to the only embodiment for the protection of electrical cables outside the submerged pump, which was described above by way of example; on the contrary, it includes all variants thereof deriving from the same principle and which may differ in various constructional forms, and it is apparent that all the technically equivalent solutions are within the scope of the present invention.

The following are claimed:

1. A submerged pump (1), comprising a covering provided with a cylindrical lateral wall (20) and protection means (2) for electrical cables externally restrained to a pump (1) body, said protection means (2) forming a channel to lodge said cables, characterized in that said protection means (2) are predisposed to be restrained to the pump (1) body by means of quick fixing devices (4) operable by means of pushes or click lifting by radial pressure; wherein said pump (1) comprises bayonet sliding triggers (5) and said devices (4) are associable to said bayonet sliding triggers (5) for quick and stable locking and releasing between said means of protection (2) and the lateral wall (20) of the pump (1) with interposed fixed elements (6) and a resilient protection band (12) as a suction filter for the intake of liquid.

2. The submerged pump according to claim 1, characterized in that said protection means (2) are provided with notches (9) and the quick fixing devices (4) are receptacles conformed with resilient tails (13a, 13b) which engage in said notches (9) positioned along the protection means (2) and said receptacles (4) are riveted, soldered, or joined with adhesives to a cylindrical lateral wall (20) of the pump (1) body.

3. The submerged pump according to claim 1 or 2, characterized in that the quick fixing devices (4) are conformed substantially as an arc of a circle for a surface contact to the lateral cylindrical wall (20) and are provided with resilient tails (13a, 13b) inwardly shaped, suitable to elastically deform on joining pressure to receive and hold the protection means (2) at at least one notch (9) achieved along the longitudinal development of the protection means (2).

4. The submerged pump according to claim 1, characterized in that the bayonet sliding triggers (5) comprise a lantern-sleeve (6) applied to the body of the pump (1), conforming a shaped seat (7) suitable to receive by plugging a terminal inferior portion (8) of the protection means (2).

5. The submerged pump according to claim 4, characterized in that the shaped seat (7) is provided with a cavity positioned radially in the lantern-sleeve (6), partially externally contained by two appendices (10a, 10b).

6. The submerged pump according to claim 1, characterized in that the protection means (2) are constituted by a longitudinal raceway element having a section similar to a U profile, provided with edges (11a, 11b) which extend for a surface support contact with a cylindrical external wall of the body of the pump (1).

7. The submerged pump according to claim 4, characterized in that said lantern sleeve (6) is partially lined with a resilient protection band (12), as a suction filter, press-fitted into said notch (7), locked in position by two appendices (10a, 10b) inserted in respective notches (14a, 14b) positioned on an edge of said resilient protection band (12) for the suction and intake of liquid in the pump (1).

\* \* \* \* \*